United States Patent Office 3,335,960
Patented Aug. 15, 1967

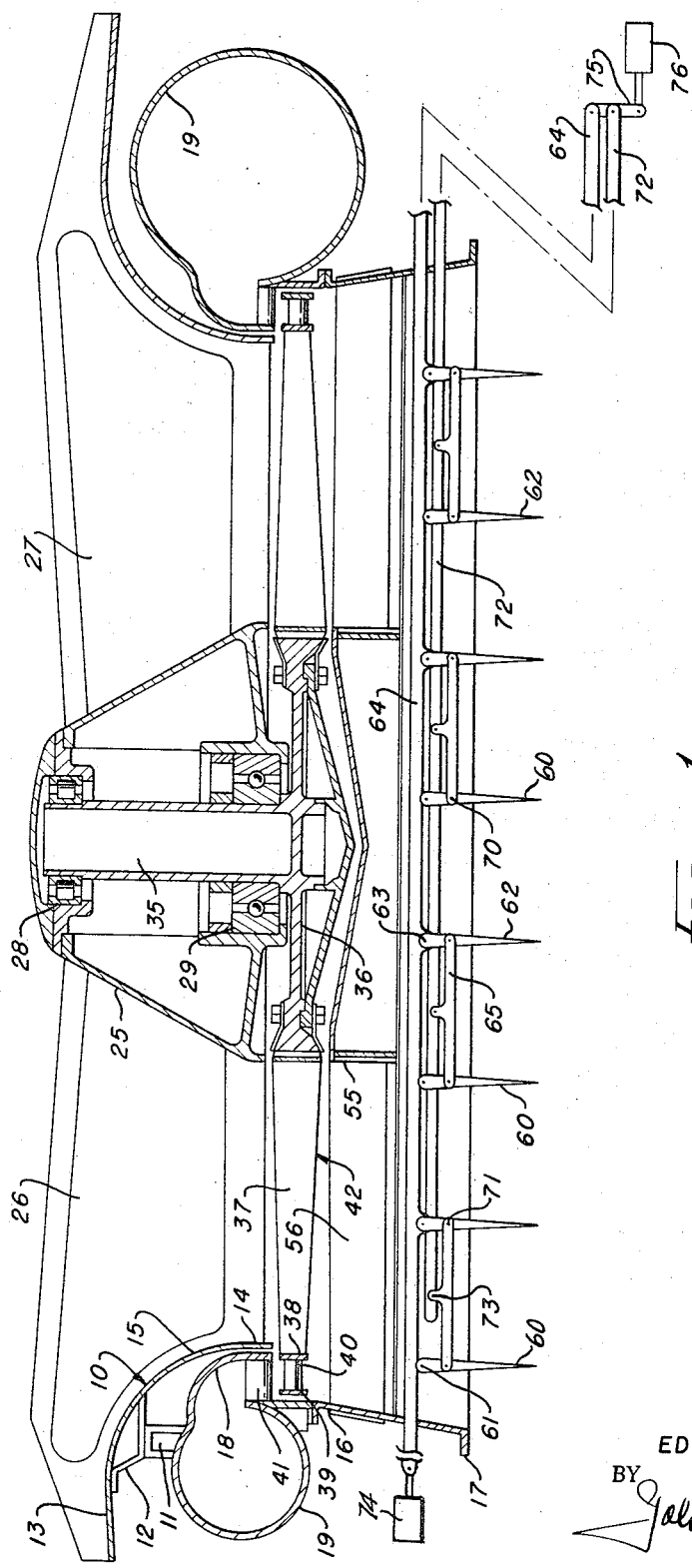

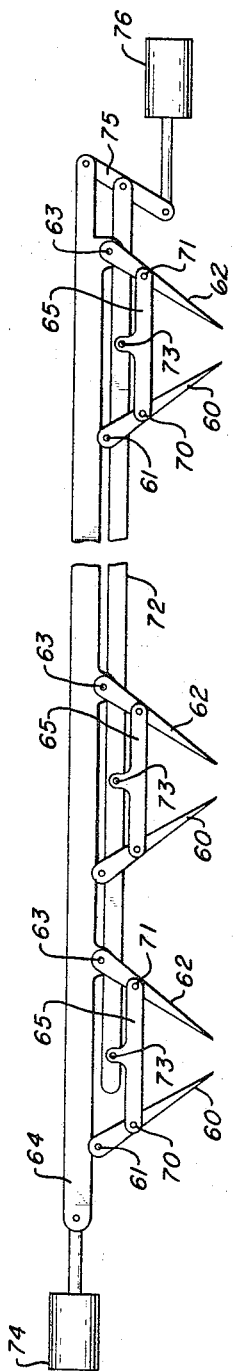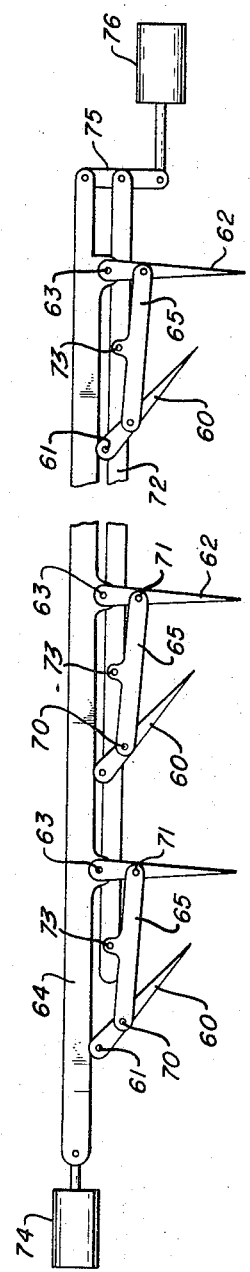

3,335,960
LOUVER ACTUATION SYSTEM
Edgar D. Alderson, Berwyn, Pa., assignor to General Electric Company, a corporation of New York
Filed Mar. 4, 1965, Ser. No. 437,124
7 Claims. (Cl. 239—265.27)

ABSTRACT OF THE DISCLOSURE

This invention is directed to a louver system or a lift fan and to the details on the pivoting and actuation for control of alternate louvers to produce stagger and reduce the fan lift by spoiling or to provide vectoring of the flow or a combination of both stagger and vectoring.

---

In lift fan systems, control attitudes of the aircraft may generally be obtained in two ways. If sufficient duct work is used then power transfer may be employed to shift more power to one fan than the other and impose moments on the aircraft. To avoid the ducting, thrust spoiling may be used. In this system, opposed pairs of louvers may be turned toward each other (staggered) to create a smaller exit area and spoil the thrust and thus reduce the lift produced by that fan. Additionally, the same louvers may be used to vector the thrust to provide directional control to the fluid and thus the aircraft. When the louvers are turned however, it is necessary to pivot them about their leading edges so that space will be conserved when they are folded out of use. Pivoting near the leading edge results in large moments to overcome and the actuating mechanism must therefore be large.

An object of the present invention is the provision of an outlet louver system which is capable of both vectoring and restricting the air discharge from the fan to provide a lift spoiling action which may, depending on the fan location, be used for aircraft roll control and, if desired, a horizontal vector which could be used for yaw control or other purposes such as propulsion.

An additional object is to provide an outlet louver system in which forces acting on the louvers are balanced between mutually opposed louvers to reduce the actuator force required to move the louvers for different airflow effects.

A further object is to provide a louver system that is responsive to remote control so that an aircraft pilot can quickly and easily set the louvers in response to flight conditions of the aircraft.

Another object is to provide a system wherein the actuators may be kept to a minimum in size and number.

Briefly stated, the louver system comprises a set of exit louvers to be located below a lift fan in which alternate louvers are attached to fixed and movable pivots. The louvers are interconnected by links attached near the center of lift of the airfoil louvers to keep the actuation forces to a minimum. The louvers attached to the movable pivots are moved by one actuator acting through those pivots on a supporting structure and a second actuator operates to move the interconnected links through a parallel structure so that the louvers are controlled to produce stagger and stagger plus vectoring capabilities.

While the specification concludes with claims particularly pointing out and distinctly claiming the subject matter which is regarded as the invention, it is believed the invention will be better understood from the following description taken in connection with the accompanying drawings in which:

FIG. 1 is a diametrical vertical cross-sectional view of a typical aircraft wing mounted lift fan assembly including an exit louver system constructed and arranged in accordance with the present invention;

FIG. 2 is a side elevational view of the louver system showing the louvers in a different relative position such as stagger from that shown in FIG. 1; and FIG. 3 is an elevational view of the louver system showing the louvers in a relative position of stagger and vectoring different from the positions shown in FIGS. 1 and 2.

Referring to FIG. 1 it should be appreciated that the louver system is applicable to any fan in any position but, for convenience, will be described as applied to a wing fan. The lift fan engine is mounted in an annular shroud, generally indicated at 10, received in an opening in the associated aircraft wing. The shroud is supported on structural members of the wing, such as member 11, by suitable brackets 12 and has at its upper end a flat, annular flange 13 overlying the adjacent upper surface of the wing. The shroud may be formed in two parts, the upper part having the flange 13 and a substantially cylindrical skirt portion 14 joined to the flange by a curved lip 15 to facilitate entry of air from above the wing into the shroud and opening. The lower portion 16 of the shroud may be generally cylindrical or slightly frusto-conical in shape and has around its bottom edge a narrow flange 17 flush with the bottom surface of the wing. The lower shroud portion is concentric with and of greater diameter than the upper portion to provide between the upper edge of the lower portion and the lower edge of the upper portion an annular gap of substantially constant width. A nozzle box 18 overlies this gap and joins the upper and lower parts of the shroud. A gas scroll 19 at least partially surrounds and communicates with the nozzle box to receive energy gas from a suitable gas generator, such as a jet engine not illustrated, and feed the gas through the nozzle box for a purpose to be described.

A bearing housing 25 of inverted bowl shape is centered in the upper portion of the shroud and supported in place by a pair of struts 26 and 27 joined to the shroud and the bearing housing and extending diametrically of the shroud chordwise of the associated wing. The bearing housing carries vertically spaced apart anti-friction bearings 28 and 29.

A vertically disposed fan shaft 35 is journalled in the bearings 28 and 29 and carries at its lower end a fan hub 36 disposed immediately below the bottom end of the bearing housing 25. Fan blades 37 extend radially from the hub substantially to the bottom edge of the upper shroud section and are surrounded at their tips by a vertically disposed flat ring 38. A flat ring 39 of larger diameter than the ring 38 surrounds and is concentric with the ring 38 and a series of turbine buckets 40 is mounted in the annular space between the rings 38 and 39 and directly under the nozzles 41 of the nozzle box 18.

With this arrangement, energy gas fed from the gas scroll 19 to the nozzle box 18 impinges on the turbine buckets 40 and drives the fan, generally indicated at 42, to force air from above the wing downwardly through the shroud 10, the exhaust from the turbine blades being also directed downwardly to supplement the lift force produced by the fan directed air.

A pan 55 is centered immediately below the fan hub 36 and is supported by stator blades 56 radiating from the pan to the skirt of the lower shroud section 16.

It is to be understood that the lift fan engine assembly, as illustrated in FIG. 1 and described above, is typical and is provided only for the purpose of illustrating the application of the exit louver system of the present invention which can be used with various modifications of lift fan assemblies.

The exit louver system of the invention comprises a plurality of alternate vanes or louvers 60 of an airfoil cross-sectional shape and with their leading edges substantially in a common plane as well be apparent. The louvers are mounted near their leading edges on fixed pivot axes 61 and alternate louvers 62 are mounted near their leading edges on movable pivot axes 63 as best seen in FIGS. 2 and 3. The louvers are generally parallel and extend across the open bottom of the lower shroud section 16 in a direction span-wise of the associated wing and are movable between a closed flush condition and an open position, as shown in FIG. 1. As is usual in lift fan assemblies, the fixed pivot point 61 is provided by journaling the ends of louvers 60 through suitable means (not shown) in the shroud 16. The movable pivot axes 63 are carried by longitudinally movable bar 64 extending transversely of the louvers above the fixed pivot axes 61 and each pair of adjacent louvers 60 and 62 is connected together preferably near the center of lift of the louver airfoils by a link 65.

The links 65 are pivotally connected at their ends to the corresponding louvers by pivotal connections as indicated at 70 and 71 which connections are located preferably from one-third to one-half of the chordwise dimension of the louvers from the leading edges for close balance of the airfoil lift moments. A bar 72 extends longitudinally of and above the links 65 and is joined to the links by pivotal connections 73 which pivotal connections may be located at or adjacent to the mid-length locations of the links. Thus, a fixed and movable louver supporting structure is provided.

An actuator 74 for stagger control such as a hydraulic piston and cylinder device, is connected to one end of the bar 64 for longitudinal movement of the bar. This will move the movable pivot axes 63 of the alternate louvers 62 toward or away from the fixed pivotal axes 61 of louvers 60. A compensating lever 75 is pivotally connected at one end of bar 64 and is connected within its length to the corresponding end of bar 72. In the arrangement shown in FIGS. 2 and 3 the actuator 74 and the lever 75 are conveniently at opposite ends of the bar 64. A second independent actuator 76 for vector control is connected to the opposite end of lever 75.

With the above described arrangement it can be seen in FIG. 1 that if bar 64 is held fixed and actuator 76 is operated to the right each louver rotates counterclockwise about its pivot toward a closed position, including the flow to the right and causing the airflow to produce a lateral reaction force towards the left.

If it is not desired to adjustably spoil or decrease the lift produced by the lift fan assembly it is necessary to reduce the exit area by staggering the louvers. To do this, actuator 74 is operated to move bar 64 to the right, as shown in FIG. 2. This moves all of the movable pivot axes 63 to the right rotating louvers 62 clockwise and also inclines compensating lever 75 from the substantially vertical position shown in FIG. 1 to an inclined position in which the upper end of the lever is displaced to the right, as shown in FIG. 2. This moves bar 72 to the right but only one-half the extent of movement of bar 64 if bar 72 is connected to lever 75 substantially at the mid-length location of the lever or proportionally if connected elsewhere. During this operation the lower end of lever 75 is held stationary by actuator 76.

The above movements of bars 64 and 72 move the upper ends of louvers 62 to the right or clockwise rotation and moves links 65 to the right a lesser amount. This causes the louvers 60 on the fixed axes to rotate counterclockwise toward the trailing edges of louvers 62 thereby narrowing the openings between the trailing edges of these louvers. At the same time the upper or leading edges of opposed louvers of adjacent pairs are moved toward each other thereby narrowing the openings between the leading edges of these louvers to reduce the area with less movement over that of conventional systems employing fixed leading edge pivots. Thus, the total area of the air passage openings between the louvers is reduced and the flow of air restricted thereby, reducing the lift produced by the lift fan assembly. Under these conditions as shown in FIG. 2 the direction of the airflow remains vertical and is not inclined or vectored but is spoiled by the stagger of the louver.

When it is desired to vector as well as restrict the airflow from the lift fan assembly, the bar 64 is placed in its position corresponding to the staggered or lift spoiling position (FIG. 2) of this bar just described and actuator 76 is actuated to move bar 72 to the right. This moves louvers 60 to a sharply inclined angle and louvers 62 to a less inclined angle in which positions the flow between the louvers is both restricted and vectored toward the right causing the airflow to produce a lateral force causing motion to the left, as illustrated in FIG. 3. The situation, illustrated in FIG. 3, can obviously be altered by moving actuator 76 and bar 72 to change the vector angle or by moving actuator 74 and bar 64 to change the stagger angle, each actuator producing an effect independent of the other.

For movement of the louvers to staggered position, as shown in FIG. 2, actuation of only one power device, the actuator 74, and for movement of the louvers from staggered position, FIG. 2, to vector position, FIG. 3, actuation of only one power device, the actuator 76, is required. The actuating devices do not have to be excessively powerful and the bars 64 and 72 and links 65 do not have to be excessively strong and heavy since the arrangement is effective to balance out a large part of the forces that would otherwise have to be overcome by the ordinary louver control mechanism. By connecting the links 65 to the louvers at a distance of at least one-third of the chordwise dimension of the louvers from the louver mounting axes, the forces acting on the louvers when in the staggered position are carried by the links in tension. When the louvers are moved between the staggered position and the vectored position the louvers moving toward vertical position assist, through the connecting links, to move the opposing louvers toward their inclined position. When the louvers are moved to their closed or folded position the operation of the lift fan is discontinued or so reduced that there is very little force opposing this movement.

While there has been described a preferred form of the invention, obvious modifications and variations are possible in light of the above teachings. It is therefore to be understood that within the scope of the appended claims, the invention may be practiced otherwise than as specifically described.

I claim:

1. An exit louver system for a mounted lift fan assembly comprising,
   a fixed pivot louver supporting structure below the lift fan assembly,
   a movable pivot louver supporting structure connected to said fixed structure,
   louvers arranged in parallel relationship below said structures and alternately carried by said fixed structure and said movable structure for swinging movements about the pivot axes adjacent their leading edges,
   links connecting said louvers together in pairs in which each pair includes one fixed axis louver and one movable axis louver,
   movable means connected to said links for simultaneously moving said links in longitudinal directions, and
   actuator means connected to independently move said movable supporting structure and said movable means.

2. A louver system comprising,
   a plurality of louvers arranged in parallel spaced apart relationship,
   fixed pivot axes supporting alternate louvers,
   movable pivot axes supporting the other louvers,
   said louvers being of airfoil shape and said pivot axes extending longitudinally of the leading edges of said louvers, link means interconnecting the louvers in pairs of opposed louvers at locations spaced chordwise of said louvers from said pivot axes, a movable support structure connected to said movable axes, means actuating said support structure to move the movable axes toward and away from the adjacent fixed axes, connecting means interconnecting said link means for moving said link means longitudinally to swing said louvers about their supporting axes, and independently controllable actuator means operatively connected to said movable support structure and said link connecting means.

3. In an exit louver system for an airflow producing fan assembly, a plurality of louvers arranged in spaced apart and parallel relationship, means supporting said louvers for swinging movements about individual pivot axes adjacent corresponding longitudinal edges of said louvers, link means interconnecting the louvers of successive pairs of louvers at locations spaced from said pivot axes to maintain constant the spacing between the interconnected louvers at such locations, and means connected to the supporting means and operable to change the spacing between said pivot axes in a manner to oppositely rotate adjacent louvers of each pair and thereby reduce the total area of the spaces between said louvers.

4. In an exit louver system for an airflow producing fan assembly, a plurality of louvers arranged in spaced apart and parallel relationship, means supporting said louvers for swinging inclining movements about pivot axes located adjacent the edges of said louvers and substantially in a common plane, link means connecting the louvers of successive pairs of louvers at locations spaced chordwise of said louvers from the corresponding pivoted axes to maintain the spacing between the interconnected louvers constant at the location of said link means, means connected to said supporting means and operative to change the spacing between said pivot axes in a manner to oppositely rotate adjacent louvers of each of said pairs, and means connected to move said link means to vary the relative inclination of the two louvers of each pair of louvers.

5. The arrangement set forth in claim 4 wherein said pivotal axes are alternately fixed and movable and those louvers having movable pivoted axes are carried by a common movable support structure.

6. The arrangement set forth in claim 4 wherein a bar member is connected to said link means to impart simultaneous swinging movements to said louvers.

7. The arrangement set forth in claim 4 wherein said pivotal axes are alternately fixed and movable and those louvers having movable pivotal axes are carried by a common movable support structure, a bar member connected to said link means to impart simultaneous swinging movements to said louvers, and independently controllable power actuators connected to said support structure and said bar member to rotate said louvers to produce predetermined restricting and vectoring of the airflow through said louver system.

References Cited

UNITED STATES PATENTS

| 1,449,099 | 3/1923 | Hall | 244—23 |
| 1,959,270 | 5/1934 | Hedlof | 244—23 |
| 2,838,257 | 6/1958 | Wibault | 244—23 |
| 2,964,905 | 12/1960 | Hewson et al. | 60—35.54 |
| 2,968,453 | 1/1961 | Bright | 244—12 |
| 3,081,597 | 3/1963 | Kosin et al. | 244—23 |
| 3,123,320 | 3/1964 | Slaughter | 244—12 |

DONLEY J. STOCKING, *Primary Examiner.*

HENRY F. RADUAZO, *Examiner.*